United States Patent Office 3,312,597
Patented Apr. 4, 1967

3,312,597
COATED PARTICLE FUELS FOR
NUCLEAR REACTORS
Eugen Glueckauf, Didcot, England, assignor to United
Kingdom Atomic Energy Authority, London, England
No Drawing. Filed Jan. 14, 1963, Ser. No. 251,074
Claims priority, application Great Britain, Jan. 30, 1962,
3,548/62
5 Claims. (Cl. 176—67)

The present invention relates to fuel for nuclear reactors and in particular to fuels for use in high temperature reactors.

The present philosophy regarding the fuels for use in high temperature reactors is to endeavour to provide a fuel which is inherently retentive of the fission products formed and many proposals have been made regarding the fuels which may be used. It is apparent that metallic uranium fuel cannot be used as the temperature within the reactor is too high. The alternative is therefore to use ceramic or cermet fuels and at the present time it appears that it is desirable to sheath or encase the actual fuel in an outer sleeve or container of ceramic material since the only metals which appear to be possible, namely stainless steel and beryllium, introduce further difficulties. In the high temperature reactor experiment known as Dragon, the fuel is encased in graphite but it also seems possible that it might be encased in such materials as alumina or beryllia. However, it has become apparent that it is impossible, in the present state of the art, to provide a graphite artifact which is impermeable to the fission products and indeed we are led to believe by the most recent research that it is theoretically impossible to provide a graphite article which will be impermeable at high temperatures to caesium, strontium and barium, known to be the fission products most likely to cause difficulty in this connection. On the other hand, it appears that it may be possible to produce graphite or pyro-carbon layers on articles which will be sufficiently impermeable to the gaseous fission products such as krypton and xenon to prevent any substantial entry of such fission product into the coolant stream.

In ceramic fuels which have been proposed for reactors of this general type, uranium dioxide and uranium dicarbide have been favoured but in general there appears to be difficulty in the use of uranium dioxide for at the temperatures postulated it is liable to react with graphite and carbon and, furthermore, its thermal conductivity is so low that the centre of the fuel elements may reach such a high temperature that melting or severe crystal growth may take place and experiments have shown us that these high temperatures are liable to lead to the excessive release of fission products. Consequently it has hitherto appeared that dicarbides, coated or sheathed with graphite or pyrocarbon, are the preferred fuels and in fact a uranium-thorium-dicarbide has been selected at the present time as the fuel for the Dragon experiment. Many different proposals have been made to reduce the escape of fission products from this fuel, but insofar as there has been much difficulty in reaching a final decision regarding the fuel to be used, it may be said that none of the prior proposals is outstandingly superior.

It is an object therefore of the present invention to provide an alternative fuel composition.

According to the present invention, a fuel composition primarily for use in a high temperature reactor comprises kernels of uranium monocarbide coated with a metallic carbide compatible with uranium monocarbide.

Our experiments have shown that insofar as the diffusion of the solid fission products is concerned, e.g. of caesium or barium, the monocarbide of uranium is considerably more retentive than the dicarbide and we have calculated that a fuel kernel of 100 microns diameter will provide a delay of the order of a year or more for 90% of the caesium content of the kernel.

The uranium monocarbide, it should be explained, is not completely compatible with carbon or graphite coatings at high temperature and consequently the kernel must be provided with a compatible coating and our experiments have shown that silicon carbide is such a coating at least for temperatures up to 1500° C. Moreover our experiments lead us to believe that silicon carbide is of itself retentive of fission products to some extent. It is also possible that zirconium carbide might be used.

The coating of silicon carbide may be provided on the kernel by known techniques or alternatively may be applied by the thermal decomposition of a suitable silicon containing gas or mixture such as, for example methyl trichloro silane ($CH_3SiCl_3$) or silicon tetrachloride mixed with methane.

Unfortunately at the high temperatures which are involved in these reactors, the vapour pressure of silicon carbide is high and consequently there is an apparent risk that the coating may be caused to evaporate or sublime with detrimental results.

Therefore according to a further feature of the invention, a second coating may be applied to the particles and this second coating is very desirably pyrocarbon which may be deposited upon the layer of silicon carbide by the decomposition of a hydrocarbon gas at an appropriate temperature. The preferred fuel particles therefore comprise a kernel of uranium monocarbide of, for example of 100 microns diameter, an enclosing layer of silicon carbide having a thickness of, for example 30 microns and possibly an outer encasing layer of pyrolitic carbon having, for example a thickness of 50 microns.

For a number of reasons partly connected with manufacture of the particles, a thin layer of pyro-carbon may also be placed between the monocarbide kernel and the protecting carbide layer.

These composite particles which may desirably be called "nodules" may be embedded in a matrix of, for example carbon, graphite or other materials, to form a fuel compact and a number of these compacts may, if desired, be assembled together and may be enclosed within an outer sleeve of carbon or graphite to form a complete fuel element.

It may be desirable to vary the composition of these fuel kernels, for example by the admixture of thorium monocarbide (ThC) in order to breed uranium-233 or by the admixture of a proportion of the lower carbides of plutonium (PuC or $Pu_2C_3$).

As an example data are given for SiC coated fissile kernels of the type, using first a very thin layer of pyrocarbon (2–3$\mu$), then 40$\mu$ SiC, then another 60$\mu$ of pyrolytic carbon, and these are compared with coatings of pyrolytic carbon only.

After neutron irradiation in a high-flux reactor the nodules were then heated at 1500° for 200 hours and the released fraction of different fission products was analysed. The results are given in the following table which illustrates well the advantages of carbide coatings.

| Nodule | Fractions released | | | |
|---|---|---|---|---|
| | $Xe^{133}$ | $Cs^{137}$ | $Ba^{140}$ | $I^{131}$ |
| Carbon coated only | $<4\times10^{-5}$ | $<10^{-4}$ | 0.3 | 0.03 |
| With SiC layer | $10^{-6}$ | $<4.10^{-4}$ | $3\times10^{-5}$ | $<4.10^{-6}$ |

I claim:
1. A fuel for nuclear reactors comprising kernels of uranium monocarbide coated with a metallic carbide compatible with uranium monocarbide and chosen from the group consisting of the carbides of silicon and zirconium, and an outer-layer of pyro-carbon disposed over the said metallic carbide.

2. A fuel according to claim 1 including a very thin layer of pyro-carbon disposed between the uranium monocarbide and the metallic carbide.

3. A fuel according to claim 1, wherein the uranium monocarbide is mixed with a carbide selected from the group consisting of thorium monocarbide and the lower carbides of plutonium.

4. A fuel according to claim 1, wherein the coated kernels are disposed in a matrix of a material selected from the group consisting of carbon and graphite to form a "fuel compact."

5. A fuel according to claim 4, wherein a plurality of fuel compacts are located within a sheath made of a material selected from the group consisting of carbon and graphite to form a fuel element.

References Cited by the Examiner

UNITED STATES PATENTS

| | | | |
|---|---|---|---|
| 3,018,238 | 1/1962 | Layer et al. | 204—154.2 |
| 3,039,944 | 6/1962 | Zumwalt | 204—154.2 |
| 3,108,936 | 10/1963 | Gale | 176—91 |
| 3,122,595 | 2/1964 | Oxley | 176—89 |
| 3,135,665 | 6/1964 | Koutz et al. | 176—91 |
| 3,151,037 | 9/1964 | Johnson et al. | 176—67 |
| 3,166,614 | 1/1965 | Taylor | 176—90 |

FOREIGN PATENTS 878,927  10/1961  Great Britain.

OTHER REFERENCES

AEC Report BMI-1442, May 1960, pp. p-1, p-2, s-6 and s-7.

AEC Report NYO-9064, Apr. 30, 1961, pp. 3-1, 3-3, 3-6, 3-7, 3-24, 3-27, 5-1 through 5-7 and 6-11.

Nuclear Fuel Elements, by Hausner et al., December 1959, pp. 197-202, 209-212, 265, 271 and 272.

Nuclear Metallurgy, vol. VI, November 1959, pp. 91-93.

Reactor Core Materials, vol. 1, No. 3, August 1958, pp. 52 and 53.

Reactor Core Materials, vol. 4, No. 2, May 1961, pp. 58 and 59.

WADC Technical Report, 59-363, October 1959, p. 1.

L. DEWAYNE RUTLEDGE, *Primary Examiner.*

REUBEN EPSTEIN, CARL D. QUARFORTH,
*Examiners.*

R. W. MacDONALD, J. V. MAY, *Assistant Examiners.*